US010502822B2

(12) United States Patent
Stove

(10) Patent No.: US 10,502,822 B2
(45) Date of Patent: Dec. 10, 2019

(54) WIND TURBINE REJECTION IN NON-SCANNING RADAR

(71) Applicant: Thales Holdings UK Plc, Surrey (GB)

(72) Inventor: Andrew Gerald Stove, Crawley (GB)

(73) Assignee: THALES HOLDINGS UK PLC, Berkshire (GB)

( * ) Notice: Subject to any disclaimer, the term of this patent is extended or adjusted under 35 U.S.C. 154(b) by 462 days.

(21) Appl. No.: 14/757,498

(22) Filed: Dec. 23, 2015

(65) Prior Publication Data
US 2016/0178731 A1    Jun. 23, 2016

(30) Foreign Application Priority Data
Dec. 23, 2014   (GB) .................................. 1423147.6

(51) Int. Cl.
*G01S 13/00* (2006.01)
*G01S 7/41* (2006.01)
*G01S 13/52* (2006.01)

(52) U.S. Cl.
CPC .............. *G01S 13/003* (2013.01); *G01S 7/41* (2013.01); *G01S 13/52* (2013.01)

(58) Field of Classification Search
CPC ........... G01S 13/003; G01S 7/41; G01S 13/52
USPC ......................................................... 342/90
See application file for complete search history.

(56) References Cited

U.S. PATENT DOCUMENTS

| 4,345,252 | A  | 8/1982 | Carre et al. |
| 8,717,230 | B1* | 5/2014 | Fischi ................... G01S 7/2813 |
| | | | 342/159 |
| 2004/0064066 | A1* | 4/2004 | John .................. A61B 5/04845 |
| | | | 600/559 |
| 2008/0094274 | A1 | 4/2008 | Nakanishi |
| 2008/0111731 | A1 | 5/2008 | Hubbard et al. |
| 2008/0195338 | A1 | 8/2008 | Geisheimer et al. |
| 2012/0092210 | A1 | 4/2012 | Liu |
| 2012/0105272 | A1* | 5/2012 | Moruzzis ................ G01S 7/414 |
| | | | 342/159 |

FOREIGN PATENT DOCUMENTS

| DE | 102013004463 A1 | 9/2014 |
| EP | 0769706 A1 | 4/1997 |
| EP | 1059541 A2 | 12/2000 |
| EP | 2369361 A1 | 9/2011 |

(Continued)

OTHER PUBLICATIONS

European Search Report for EP Application No. 15202417, dated May 25, 2016.

(Continued)

*Primary Examiner* — Frank J McGue
(74) *Attorney, Agent, or Firm* — Hauptman Ham, LLP

(57) ABSTRACT

A signal detector for detecting an information component of a passive radar detection signal, comprises a sampler operable to obtain a sample segment, in time domain, of a radar detection signal, a signal processor operable to identify a relatively high power periodic component of the sample segment signal spectrum in contrast to a relatively low power information component of the sample segment signal spectrum, and a signal rejector operable to window the detection signal with respect to the identified periodic component, to retain parts of the signal not interfered by said periodic component.

9 Claims, 9 Drawing Sheets

(56) References Cited

FOREIGN PATENT DOCUMENTS

| GB | 1503303 A | 3/1978 |
|---|---|---|
| GB | 2484493 A | 4/2012 |
| JP | 2002236172 A | 8/2002 |

OTHER PUBLICATIONS

United Kingdom Search Report for GB Application No. 1423147.6, dated May 11, 2015.

* cited by examiner

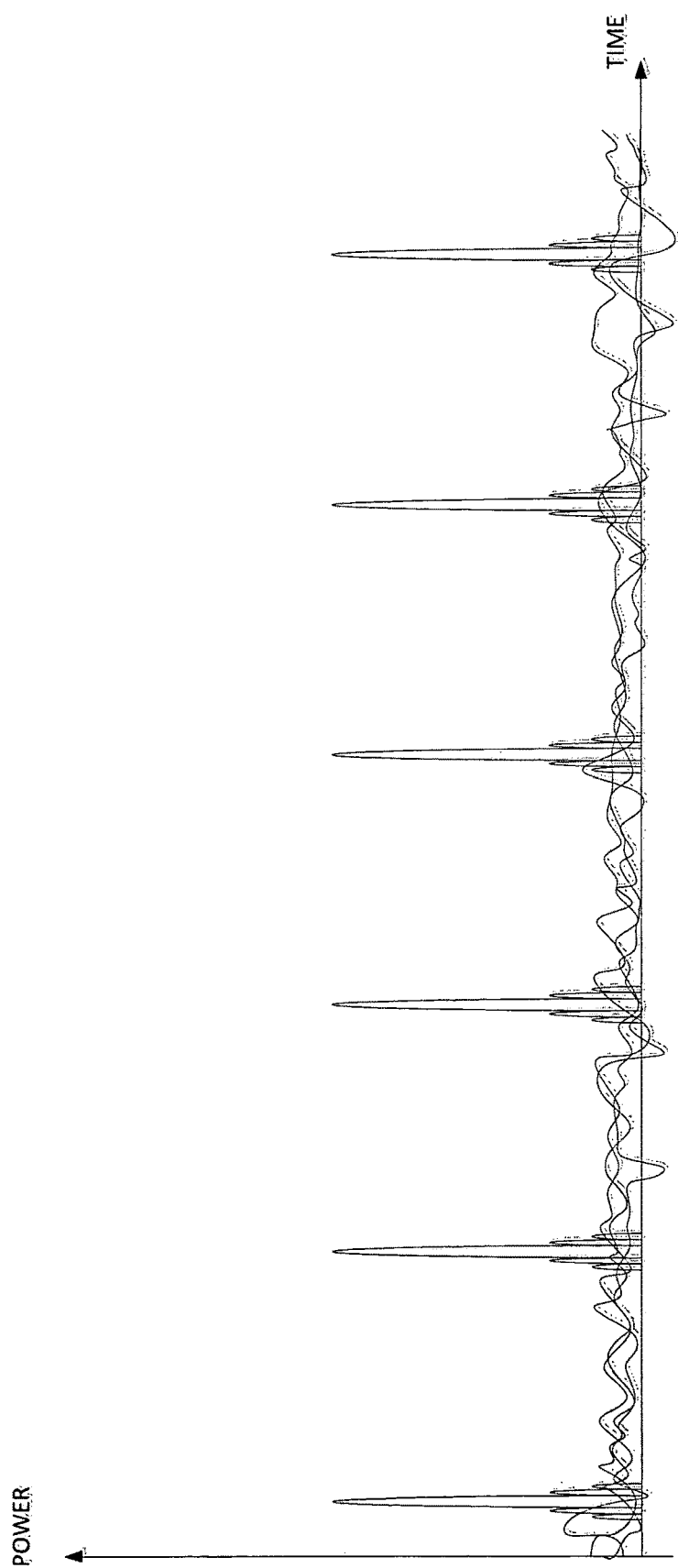

WIND TURBINE REJECTION IN NON-SCANNING RADAR

This application claims priority benefit to UK Application No. 1423147.6, filed Dec. 23, 2014, which is hereby incorporated herein by reference in its entirety.

FIELD

Embodiments described herein relate to the rejection of components of a radar signal corresponding to reflection of radio frequency (RF) radiation by wind turbine blades.

BACKGROUND

Passive radar operates by gathering at a receiver radio frequency (RF) signals reflected from objects of interest and then processing the received signals to determine locations of these objects. A key characteristic of passive radar is the absence of a specific transmitted radar signal—the passive radar system instead relies on the (highly likely) presence of other RF transmitters in the locality, which themselves emit RF signals which the passive radar system can then employ. Such RF radiation that does exist will inevitably be reflected from an object of interest. A passive radar system relies on being able to detect them, and to correlate these reflections with signals received directly from the RF emitters. With a plurality of such correlations, triangulation can be used to determine the position of an object.

Passive radar is particularly useful in determining aircraft position, such as for the purposes of air traffic control. As it does not rely on the production of a specific radar emission, but instead processes signals resultant from reflections, by radio-reflective objects, of other RF emissions such as radio broadcast signals, communication signals or navigation signals, passive radar depends on the processing of a low power, relatively wide-band received RF signal.

A classical radar emits pulses and has a rotating directional antenna, which means that each target is viewed only intermittently. This means that it can be difficult to distinguish different types of target movement. In particular, it can be difficult to distinguish the patterns of the returns from aircraft and wind turbines.

Air traffic management (ATM) radar is particularly susceptible to disruption from the effects of wind turbines. Wind turbines are becoming increasingly prevalent. They are often relatively tall, within range of a low-flying aircraft. Turbine blades are constructed with structural strength and mass as the main considerations; RF reflectivity is generally not a major concern. Thus, it is entirely possible that a turbine blade will be a reflective object in the RF spectrum. The motion of a turbine blade can cause the generation of reflections of RF radiation, which may impinge on a passive radar receiver. As the blades of a wind turbine, in use, rotate about the turbine axis, the blades can cause momentary reflection of RF radiation directed at the passive radar receiver. At the receiver, these momentary reflections could, depending on the power of the RF impinging on the blade, cause periodic relatively high power "flashes" of RF energy. These flashes of RF emission can be difficult to distinguish from reflections from objects of interest. This can cause false tracks to be created which can distract an operator and can interfere with the tracking of genuine objects of interest. This phenomenon is amplified in the event that an object of interest (e.g. an aircraft) is travelling over a wind farm (i.e. a plurality of wind turbines concentrated in a designated area), wherein many different extraneous turbine-blade reflections may cause so many erroneous readings at a passive radar receiver that the position of an object of interest may be extremely difficult to discern.

DESCRIPTION OF DRAWINGS

FIG. 9 is a time domain graph showing operation of the third embodiment.

DESCRIPTION OF EMBODIMENTS

Figure 1:
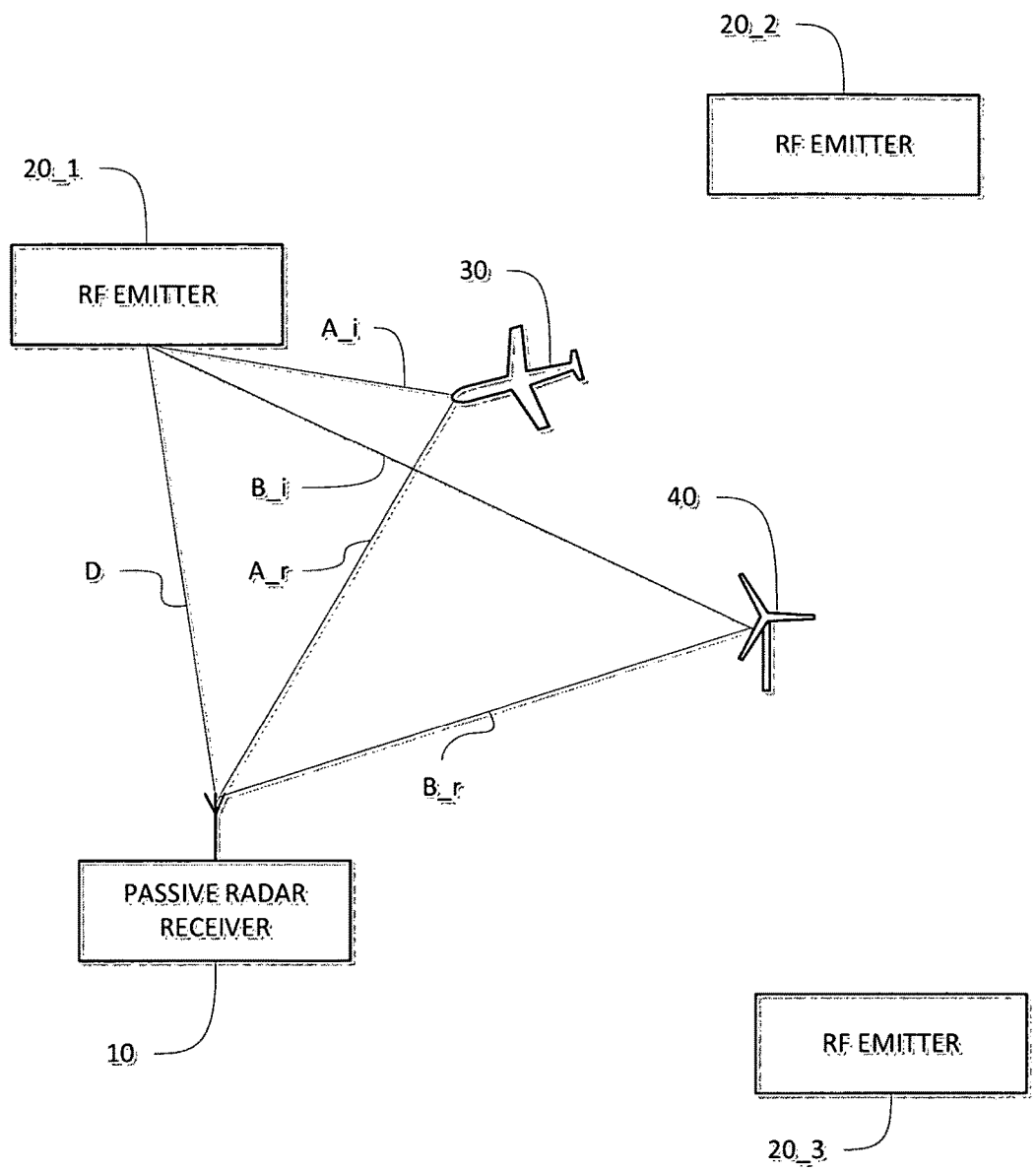
FIG. 1 is a schematic drawing of a passive radar system in an environment of interest.

In general terms, an embodiment disclosed herein provides a signal processor for processing a signal emanating from a non-scanning radar. The signal processor is operable to seek to detect a relatively high power component, and then to reject this component from the signal, retaining non-interfered parts of the signal.

Another embodiment disclosed herein provides a signal detector for detecting an information component of a non-scanning radar detection signal, comprising a sampler operable to obtain a sample segment, in time domain, of a radar detection signal; a signal processor operable to identify a relatively high power, relatively short duration component of the sample segment signal spectrum in contrast to a relatively low power relatively long duration information component of the sample segment signal spectrum; and a signal rejector operable to window the detection signal with respect to the identified relatively high power component, to retain parts of the signal not interfered by said relatively high power component.

Another embodiment disclosed herein provides a signal detector for detecting an information component of a passive radar detection signal, comprising a blade flash detector for detecting a signal component defined by an envelope of relatively high power, low frequency periodic pulses compared with an information component of the detection signal, and a rejector operable to attune to the frequency of the pulses detected by the blade flash detector and to apply a rejection function to the detection signal, the rejection function being in period with the detected pulses.

Another embodiment disclosed herein provides a method of detecting an information component of a passive radar detection signal, comprising obtaining a sample segment, in time domain, of a radar detection signal, identifying a relatively high power periodic component of the sample segment signal spectrum in contrast to a relatively low power information component of the sample segment signal spectrum, and windowing the detection signal with respect to the identified periodic component, to retain parts of the signal not interfered by said periodic component.

Another embodiment disclosed herein provides a method of detecting an information component of a passive radar detection signal, comprising detecting a signal component defined by an envelope of relatively high power, low frequency periodic pulses compared with an information component of the detection signal, attuning to the frequency of the detected pulses, and applying a rejection function to the detection signal, the rejection function being in period with the detected pulses.

A particular feature of a passive radar using communication transmitters is that it sees the targets continuously. This is because the transmissions are continuous and omnidirectional. This means that there are options for more sophisticated processing schemes which can be applied to distinguish the signals in this case which are not practical with conventional radars and embodiments described herein present such a scheme.

This particular feature allows the signals received from turbines to be recognised and rejected using techniques which are not available when the signals are only visible intermittently.

Although the technique has been described herein in conjunction with a passive radar, the reader will appreciate that it is also applicable to any radar which is directed continuously towards a particular target for long periods.

Embodiments described herein comprise different examples of a passive radar receiver. A typical implementation of a passive radar receiver is illustrated in FIG. 1.

As shown in FIG. 1, a passive radar receiver 10 is operable to receive RF electromagnetic radiation, emanating from active emitters 20 and reflected from objects in the field of interest.

In FIG. 1, the field of interest includes an aircraft 30 which acts as a reflector of RF electromagnetic radiation. As shown, rays A_i and A_r respectively represent incident and reflected RF radiation originating at RF emitter 20_1 at the aircraft 30, directed to the passive radar receiver 10.

A wind turbine 40 is also shown, reflecting RF radiation from the RF emitter 20_1. Rays B_i and B_r represent reflection of this RF radiation at the turbine 40.

A further ray D is also illustrated, showing direct propagation of RF radiation from the radar emitter 20_1 to the passive radar receiver 10.

The reader will appreciate that similar reflections of emissions by the other two illustrated RF emitters (20_2 and 20_3) will arise, but these are not illustrated in FIG. 1 for reasons of clarity. Also, depending on line of sight, emissions from each of the other emitters will also propagate directly to the passive radar receiver 10 as well.

As the reader will recognise, the presence of the wind turbine 40 will complicate the signal received at the passive radar emitter, and will present an obstacle to analysis of the signal to provide a triangulation to the aircraft 30. This is compounded by the fact that, when the turbine blades are rotating, the reflections from the blades will present to the receiver as intermittent, periodic "flashes" of reflected RF radiation. These flashes might be significantly higher in power than the reflections from aircraft. During the flashes, the reflections from the aircraft could be overwhelmed by the power of the reflections from the turbine blades. Between blade flashes, the reflection activity from the turbine blades may be practically non-existent.

The geometry of a typical wind turbine blade can be considered in simplified form as a mirror of length d. This mirror will have a power reflectivity proportional to $sinc^4$ ($\theta\lambda/d$) where $\lambda$ is the wavelength of the reflected radiation, $\theta$ is the angle of incidence in radians, and sinc(x) is defined as (sin x)/x.

Thus, the quarter-power width (the angular displacement bounded by 6 dB drop from peak power) will be 0.886($\lambda$/d). This provides the basis for a model that assumes that a blade with a length of 40 wavelengths will have a "width" of approximately 1.5 degrees (approx. 0.026 radian).

The quarter-power width is a sensible way of comparing cases, but this does not imply that a 6 dB drop in reflection power will necessarily be sufficient to render the reflection from the blade insignificant at the passive radar—as will be explained in due course, a greater power drop may be required for that.

The response at the receiver from the blade flash will have sidelobes in advance of and trailing the main trace in time. These sidelobes decay away from the peak, central lobe at a rate of $1/n^4$ where n is the number of the sidelobe, so the first sidelobe is at −26 dB from the peak. In order for the power from a blade flash to be considered negligible at the passive receiver, it may be necessary for the sidelobe power to be a drop of 60 dB from the peak. For this, the reader will deduce that power drops by 60 dB only beyond n=11. That is, significant sidelobes of blade flash power will cover an angular range of 2×10.5×1.5 degrees, or approximately 30 degrees of the rotation of the turbines. With a 3 blade turbine, therefore, the receiver may be impacted by the blade flashes for 25% of the time.

Figure 2:
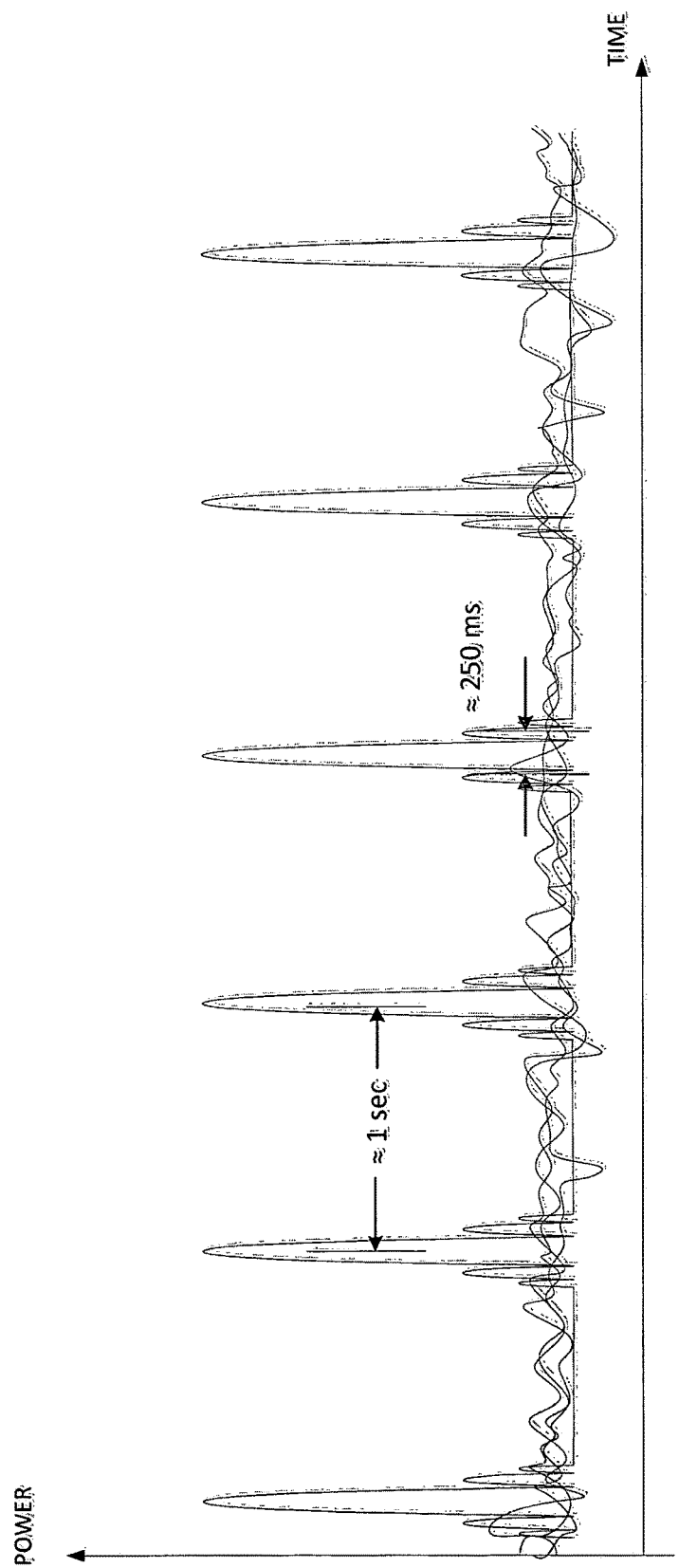
FIG. 2 is a graph illustrating a typical signal trace as received by a passive radar detector of the system of FIG. 1.

FIG. 2 illustrates an example raw signal trace received at the antennas of a passive radar receiver of the described embodiments. In this example, blade flash activity is detected from a turbine having three blades (as is typical) oriented with rotational symmetry, i.e. spaced 120 degrees apart. For the purpose of this example, the blade flashes (the high power peaks illustrated in FIG. 2) are 1 second apart, indicating that the turbine is rotating at a rotational speed of 1 rotation every 3 seconds.

The reader will appreciate that the illustration is schematic. The signal trace components are envelopes, representative of the presence of RF signals received from various sources. Each envelope encompasses RF signal frequencies, characteristic of their sources, which will generally appear as noise until analysed by cross-correlation.

The envelope of the blade flash as illustrated encompasses the aforementioned sidelobes. The power drop across the blade flash is such that the time between 60 dB drop points is approximately 250 ms. Thus, the blade flash interferes with proper detection of desired reflections in about 25% of the trace.

Figure 3:
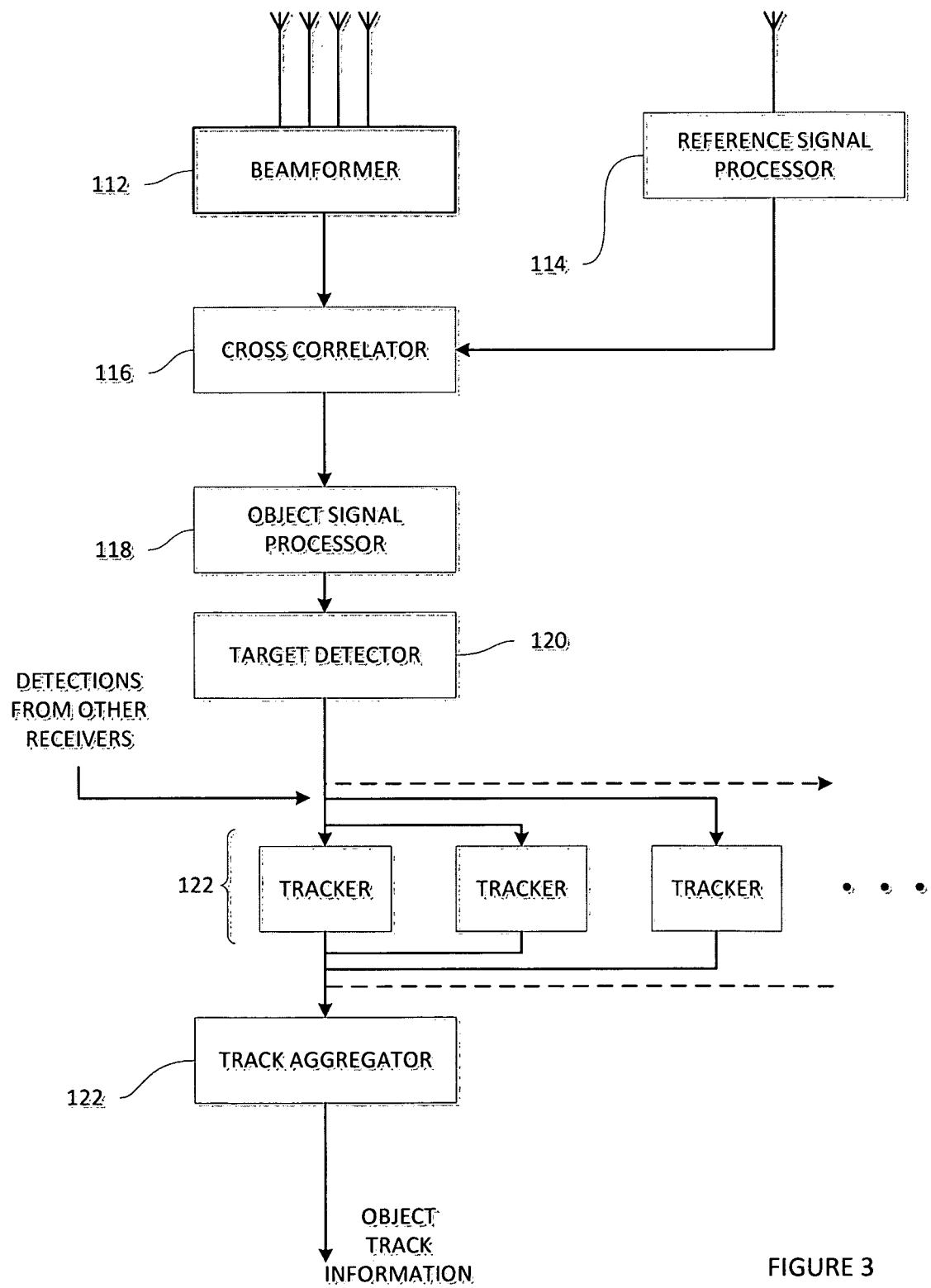
FIG. 3 is a schematic diagram of a passive radar detector of the system illustrated in FIG. 1.

FIG. 3 illustrates a schematic structure of a passive radar detector in accordance with embodiments described herein.

The passive radar detector 10 comprises a plurality of antennas 110. The antennas are arranged to enable beamforming as desired. The antennas 110 are connected to a beamformer 112 which manages a beamforming process. Beamforming is a known technique for using path delays to determine the direction of received radiation. A detailed description of beamforming in the context of the present embodiments is not required for an understanding of the disclosure.

While this specific embodiment uses a plurality of antennas, to provide a beamforming capability, a simple example embodiment could employ a single omnidirectional antenna.

In this embodiment, one of the antenna signals bypasses the beamformer 112 and enters a reference signal processor 114. This presents, to later stages of the receiver, a reference signal representative of an omnidirectional response, so that the beamformed received signal has a point of reference against which it can be compared.

The beamformed signal is presented to a cross correlator 116. The cross correlator 116 also receives the processed reference signal from the reference signal processor 114. The cross correlator 116 uses the reference signal to detect target echoes and to find correlations between such echoes and components of the reference signal.

The signal is then passed to an object signal processor 118. The object signal processor 118 conditions the signal, to reduce the impact of noise and interference on the signal for later processing.

Candidate target echoes are passed from the object signal processor 118 to a target detector 120, which applies a threshold to qualify target echoes as worthy of tracking. Detections from other receivers are also introduced at this stage. Qualified target echoes are passed to a bank of trackers 122, each of which tracks a qualified target echo over time. The tracker will typically also receive detections from other receivers, as shown in FIG. 1, in order to locate the targets in three dimensions. From this, tracking signals are passed to a target aggregator 122, from which a signal can be assembled bearing object tracking information, suitable, for instance, for output on a user display, or for generation of alarm signals, depending on the requirements of the implementation.

This generalised structure is common to all of the embodiments described herein. Each embodiment will now be described in turn, in terms of the structure and function of its object signal processor 118.

Figure 4:
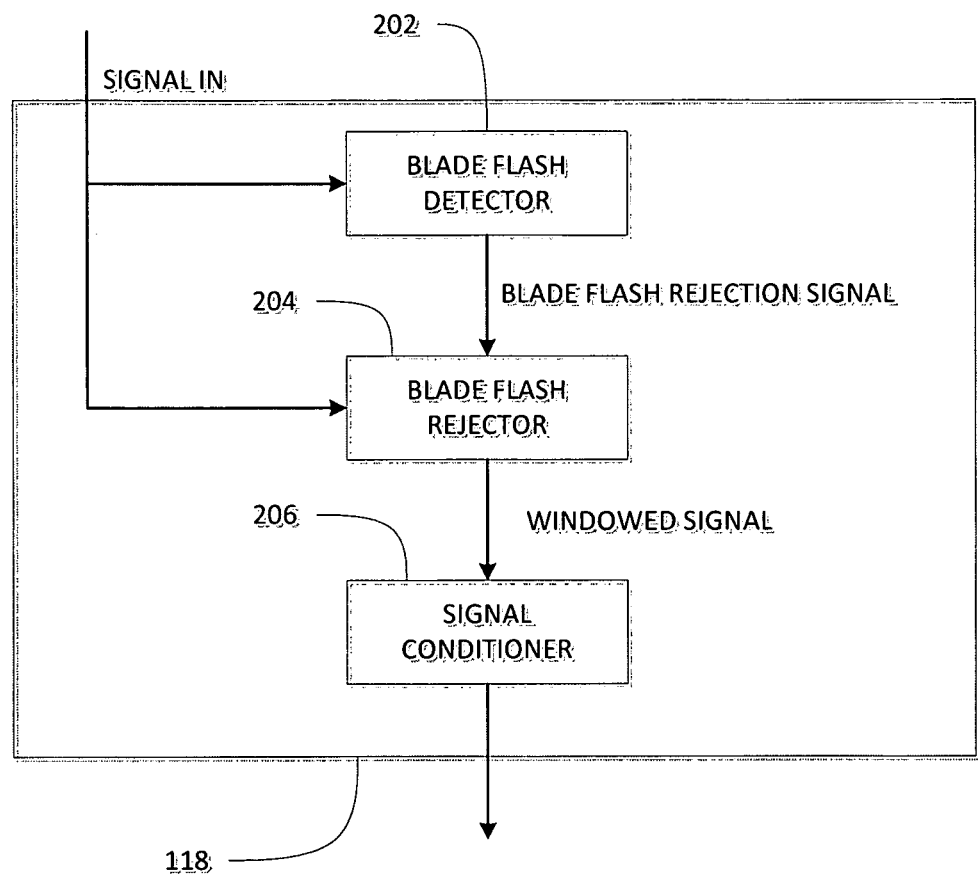
FIG. 4 is a schematic diagram of an object signal processor of the detector illustrated in FIG. 3.

In FIG. 4, the object signal processor 118 of a first embodiment is illustrated. In this first embodiment, the beamformed signal is fed into a blade flash detector 202, which is operable to detect the presence, on the signal, of periodic high power bursts of RF excitation, characteristic of blade flash. For example, the blade flash detector 202 is operable to identify the presence of a high power pulse train with an envelope frequency of 1 Hz±20%. If such a pulse train is detected, the blade flash detector 202 then outputs a windowing signal to control a blade flash rejector 204. The blade flash rejector 204 windows the input signal on the basis of the windowing signal, to reject time periods of the signal coincident with the obscuring effect of the blade flashes. Then, the windowed signal is passed to a signal conditioner 206, in preparation for detection.

Figure 5:
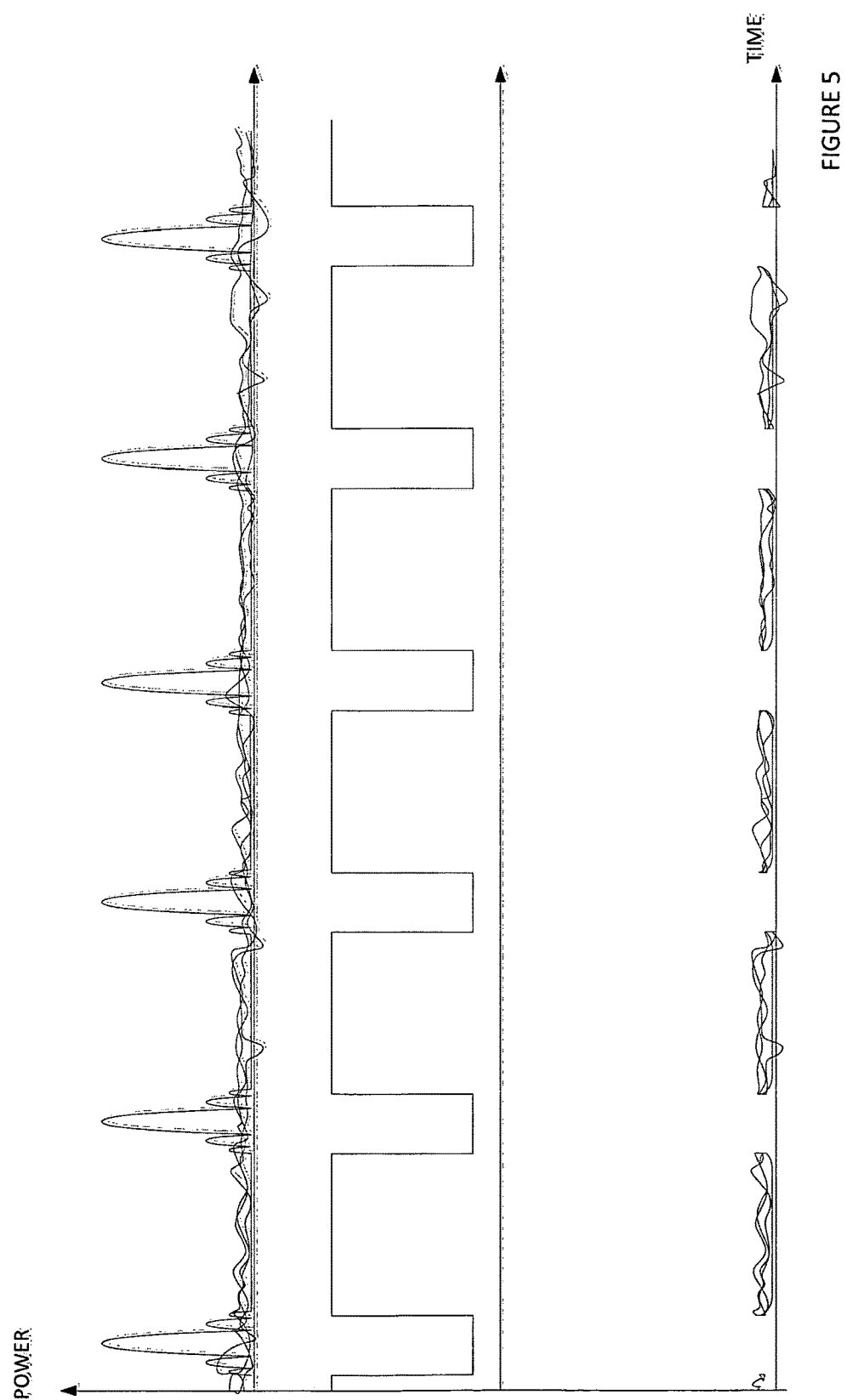
FIG. 5 is a graph showing signal processing stages of the object signal processor illustrated in FIG. 4.

The effect of this is shown in FIG. 5. FIG. 5 shows three traces. The top-most trace is the same as that illustrated in FIG. 2. The second trace is the windowing signal, which is a rectangular wave, defined by reference to peak detection on the first trace. The duty cycle of the rectangular wave is set to ensure that the impact of the blade flash peaks is not passed through to the cross correlator. In this example, the duty cycle is roughly 80%. The windowing signal effectively fluctuates between high and low values. When the windowing signal is at a high value, the blade flash rejector 204 passes the signal through, whereas when the windowing signal is at a low value, the blade flash rejector suppresses the signal entirely. This outcome is illustrated in the lowest trace illustrated in FIG. 5.

The windowing signal is triggered by peak detection. In a time sample, the blade flashes are easily detectable, even by threshold detection. It can be assumed that the peak will be centred between crossings of the threshold, and that, then, the windowing signal needs to be correlated so that each gating window is centred on the detected peaks. This can be done in real time if the signal to be processed is buffered slightly so that the window can be applied.

The result of this is a windowed signal in which 80% of the original trace remains intact. This is most likely sufficient to enable cross-correlation and target detection.

A key aspect of this approach is to recognise that the blade returns are relatively concentrated in time, and so may be eliminated with minimal impact on the signals of interest, whereas in the frequency domain they will cover a large proportion of the spectrum and cannot be eliminated without the loss of most or all of the returns from the target.

Figure 6:
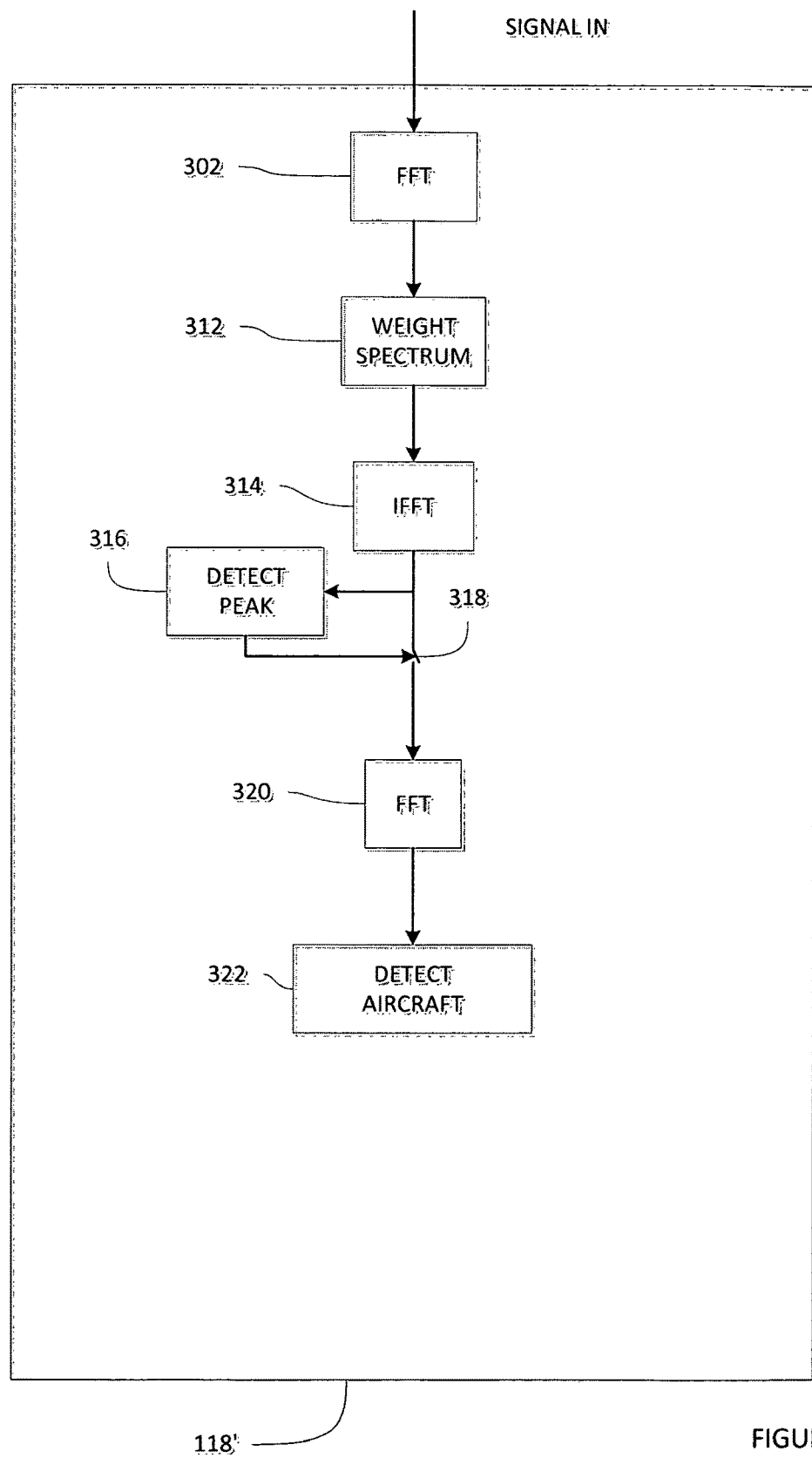
FIG. 6 is a schematic diagram of an object signal processor of a second embodiment.

However, another approach is demonstrated by a second embodiment, illustrated in FIG. 6. FIG. 6 shows another example of the object signal processor, hitherto described, and designated reference numeral 118' to distinguish it from the preceding example. In this implementation, the signal is transferred to the frequency domain, using an implementation of the fast Fourier transform (FFT) algorithm 302. The output of this algorithm is coherent, so the conversion can be inverted (IFFT) to reconstruct a version of the original signal, processing (such as filtering) having been conducted in the frequency domain.

So, as illustrated in FIG. 6, the output of the FFT 302 passes to a spectrum weighting functionality 312, typically using a cosine-squared weighting to reduce the time sidelobes of the signal. After this modification, it is converted back into the time domain through an IFFT 314. The blade flash will now be well confined in time.

The blade flash peaks are detected in a peak detection stage 316. The peak detection stage 316 drives a switch 318 on the main signal pathway, to cause blanking of the signal when peaks are detected. The signal is then converted back into the frequency domain, in another FFT stage 320, which serves to confine the signal from the aircraft, which will approximate to a single frequency, so that transformation into this domain maximises the signal to noise and optimises the ability to separate the returns from different aircraft. The aircraft can then be detected using conventional detection schemes which will be familiar to those skilled in the art of radar.

Figure 7:
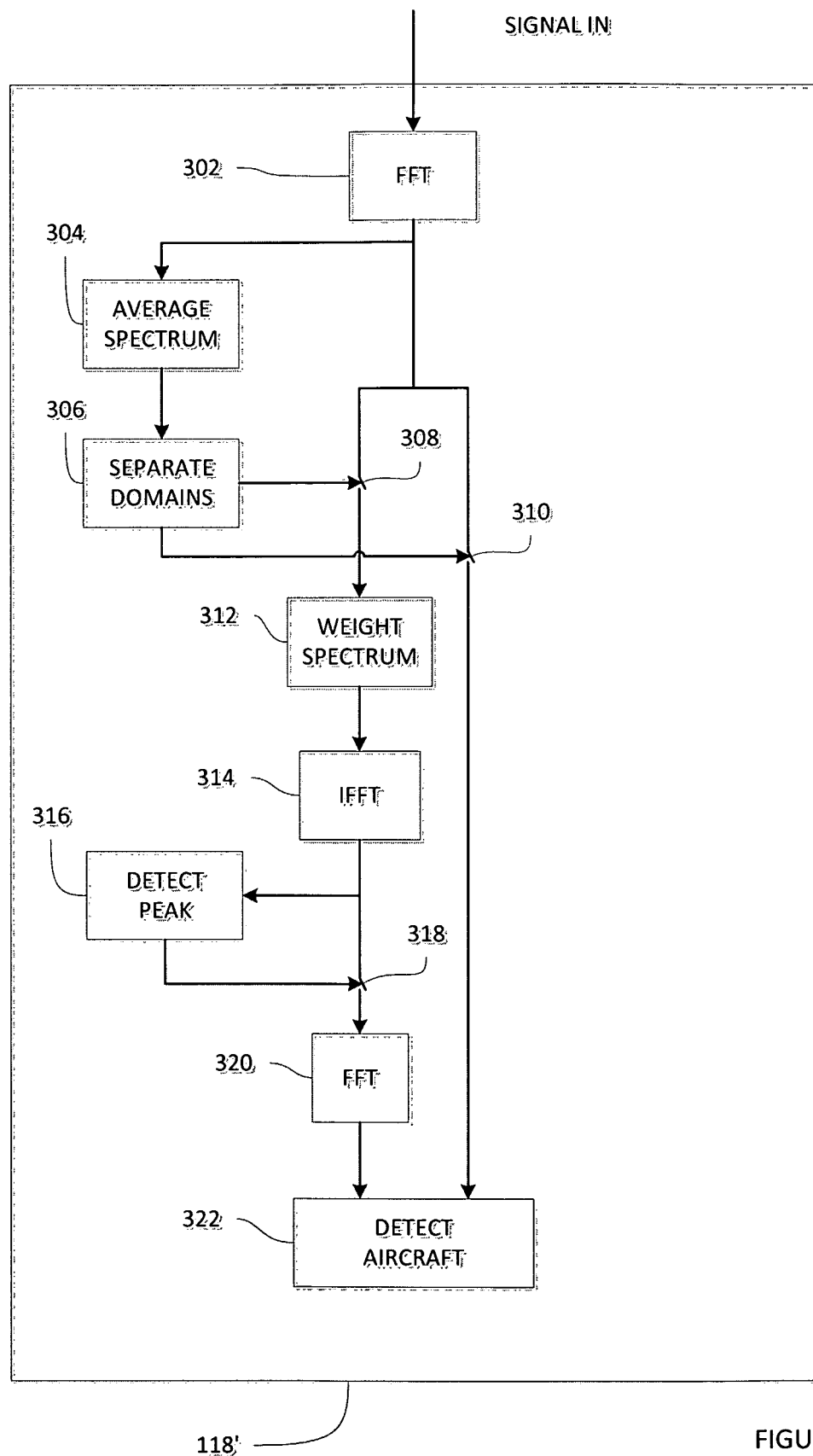
FIG. 7 is a schematic diagram of an object signal processor of a third embodiment.
Figure 8:
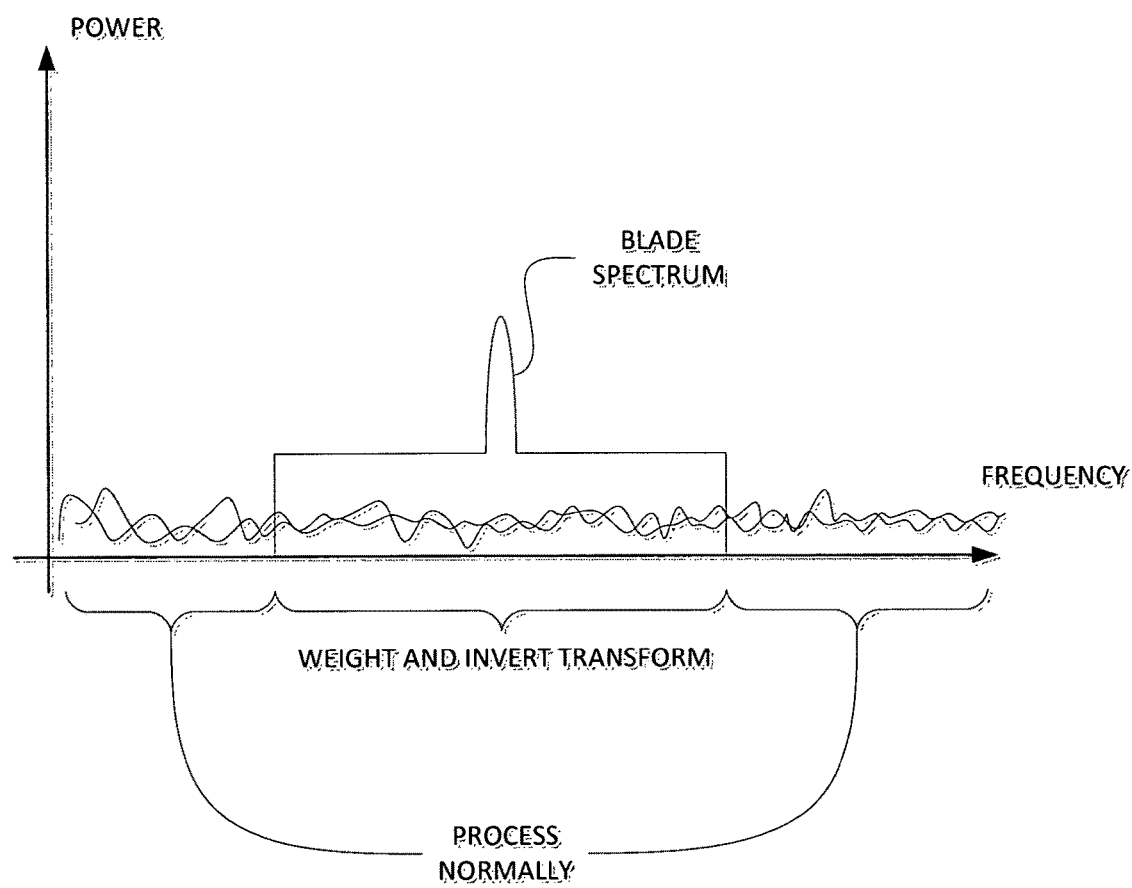
FIG. 8 is a spectrum domain graph showing operation of the third embodiment.

A third embodiment of the object signal processor is illustrated with the aid of the graphs shown in FIGS. 8 and 9. The architecture of this embodiment is as described in relation to FIG. 7, which is a modified version of FIG. 6. In this embodiment, the time domain signal is, again, transformed into the frequency domain. The spectral analysis resultant from this is then processed to separate the parts of the spectrum that contain artefacts of the blade flash from those that do not. This can usefully be done because, in general, the return from the spectrum of the blade returns will be narrower than the range of frequencies from the targets. FIG. 8 shows a typical spectral analysis. As can be seen, an idealised spectrum attributable to the blade flash is centred substantially in the middle of the spectral analysis.

This is achieved by obtaining an average value of the spectrum over a period of a second or so (box 304), and making a decision as to which parts of the spectrum are likely to be contaminated by the blade flashes. The spectrum is then split, driven by switches 308 and 310, so that only the part of the spectrum which may contain blade flashes need be processed as described above, whereas the other parts of the spectrum are passed directly to the detection stage 322.

This is shown in a simplified example (with only sidelobes up to n=2 illustrated for reasons of clarity) in FIG. 8.

Another way to express this result of applying a cosine-squared weighting is that the sidelobes of the blade flash will decay more rapidly away from the peak. It is possible, using this approach, to achieve a −60 dB decay at sidelobe n=7.

This means that the amount of data that needs to be excised by the windowing function is reduced.

While this improvement in signal excision is relatively minor, it does demonstrate that more aggressive frequency domain signal processing on the blade flash part of the spectrum can have significant impact. In general, the time duration over which a blade flash has an interfering impact on the received signal can be confined, as it will no longer contain a long train, both before and after the peak flash, of gradually decaying sidelobes. By this, a greater proportion of the received signal can be retained, between blade flashes.

It is of benefit to analyse a sufficient period of the received signal that the complete cycle of rotation of a turbine can be seen in each processing interval. So, if it can be assumed that a wind turbine typically has a rotation speed of roughly 20 rotations per minute, then a sample length of 5 seconds would ensure that at least three blade flashes were captured. By using a longer sample period, the estimate of the shape of the Doppler spectrum of the turbines in the vicinity of the passive radar detector can be averaged, for a more robust blade flash elimination process.

Of course, the reader will appreciate that the period of blade flash may not be strictly constant. While the speed of rotation of a wind turbine may not vary rapidly, some variation over time may take place. One factor influencing the rotational speed of a wind turbine is the strength of the wind incident thereon. However, it is likely that the rate of change of rotational speed will not be significant, with respect to the rotational speed itself. Thus, where this disclosure makes mention of "the period" of blade flash activity, it will be recognised that this period will not necessarily be constant, but may be substantially so from one pair of blade flashes to the next.

Weighting the spectrum of the blade flash (third embodiment described above) can lead to spectral components near the edge of the turbine spectrum, and hence targets moving at speeds giving rise to these Doppler shifts, might be obscured. In view of this, one variant embodiment provides a less sharp cut off between the blade flash spectrum and the non-blade-flash spectrum. For instance, it may be advantageous to apply a windowing function which tapers off the "out of blade flash" spectrum portion, so that the energy associated with targets near the nominal boundary between the two portions of the spectrum is not entirely lost.

All embodiments described above illustrate the suppression of the blade flash segments of the time domain sample with, in essence, zero trace. For practical reasons, it may be desirable not to do this, as this may introduce discontinuities which will themselves cause erroneous frequency components to be introduced.

Instead, an approach can be used in conjunction with any of the above described embodiments, to interpolate between the portions of retained data.

In one approach, linear interpolation can be used between the end point of one portion of retained signal data and the start point of the next portion of retained signal data.

In another approach, quadratic interpolation can be used, taking account of the rate of change at the above mentioned end and start points to fit a quadratic curve to the retained data.

In another approach, cubic interpolation can be employed; again, the objective would be to identify a cubic curve which fits the retained data, to an acceptable degree. It may not be necessary to obtain the optimal curve of best fit; this will depend on the desired performance tolerance of the system.

As the reader will appreciate, depending on computation capability, higher order curve interpolations may be employed.

In another approach, frequency spectrum analysis can be employed (such as by Fast Fourier Transform analysis) at the preceding and following retained data, to identify appropriate frequency data to interpolate between the portions of retained data.

In this case the interpolation is in effect performed after the signal has been transformed back into the frequency domain (320 in FIGS. 6 and 7) by suppressing sidebands of the target Doppler frequencies which can be identified as artefacts which were introduced when the blade flash was eliminated.

Each of these approaches will reduce the disruptive effect on the spectrum analysis of the retained signal data, after suppression of the blade flash portions.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A signal detector for detecting an information component of a non-scanning radar detection signal, comprising:
   a sampler operable to obtain a sample segment, in time domain, of a radar detection signal;
   a signal processor including a blade flash detector operable to identify a first component of the sample segment signal spectrum, the first component having a relatively high power and short duration in contrast to a second component of the sample segment signal spectrum, the first component being defined by an envelope of relatively high power, low frequency periodic pulses compared with an information component of the detection signal; and
   a signal rejector operable to attune to the frequency of the pulses detected by the blade flash detector and to apply a rejection function to the detection signal, so as to reject the detected pulses, the rejection function being in period with the detected pulses, wherein the signal rejector is operable to window the detection signal with respect to the identified first component to suppress the signal in its entirety during one or more time periods of the signal coincident with the first component and to retain parts of the signal not interfered by said first component.

2. A signal detector in accordance with claim 1, wherein the signal processor is operable to identify a periodic nature of the first component, and wherein the signal rejector is operable to window the detection signal with respect to the periodic nature of the first component.

3. A signal detector in accordance with claim 2, wherein the signal processor includes a filter for filtering the radar detection signal to obtain a filtered signal in which the duration of the first component is reduced.

4. A signal detector in accordance with claim 1, further comprising a signal interpolator operable to introduce a replacement signal component to replace a signal component rejected by the signal rejector.

5. A signal detector in accordance with claim 4, wherein the signal interpolator is operable to interpolate in the time domain.

6. A signal detector in accordance with claim 4, wherein the signal interpolator is operable to interpolate in the frequency domain.

7. A signal detector for detecting an information component of a passive radar detection signal, comprising:
- a blade flash detector for detecting a signal component defined by an envelope of relatively high power, low frequency periodic pulses compared with an information component of the detection signal; and
- a rejector operable to attune to the frequency of the pulses detected by the blade flash detector and to apply a rejection function to the detection signal, so as to reject the detected pulses, the rejection function being in period with the detected pulses.

8. A method of detecting an information component of a passive radar detection signal, comprising:
- obtaining a sample segment, in time domain, of a radar detection signal;
- identifying, by a blade flash detector, a relatively high power periodic component of the sample segment signal spectrum in contrast to a relatively low power information component of the sample segment signal spectrum, the first component being defined by an envelope of relatively high power, low frequency periodic pulses compared with an information component of the detection signal;
- attuning, by a rejector, to the frequency of the detected pulses; and
- applying, by the rejector, a rejection function to the detection signal so as to reject the detected pulses, the rejection function being in period with the detected pulses, wherein the detection signal is windowed with respect to the identified periodic component to suppress the signal in its entirety during one or more time periods of the signal coincident with the relatively high power periodic component and to retain parts of the signal not interfered by said periodic component.

9. A method of detecting an information component of a passive radar detection signal, comprising:
- detecting, by a blade flash detector, a signal component defined by an envelope of relatively high power, low frequency periodic pulses compared with an information component of the detection signal;
- attuning, by a rejector, to the frequency of the detected pulses; and
- applying, by the rejector, a rejection function to the detection signal so as to reject the detected pulses, the rejection function being in period with the detected pulses.

* * * * *